United States Patent
Lee et al.

(10) Patent No.: US 12,319,274 B2
(45) Date of Patent: Jun. 3, 2025

(54) VEHICLE DRIVING INFORMATION PROVIDING METHOD AND SYSTEM

(71) Applicants: Hyundai Motor Company, Seoul (KR); Kia Corporation, Seoul (KR)

(72) Inventors: Jun Yong Lee, Seongnam-si (KR); Sung Jae Oh, Hwaseong-si (KR); Ji Hun Choi, Goyang-si (KR); Jin Kyeom Cho, Suwon-si (KR); Sung Ik Jo, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 90 days.

(21) Appl. No.: 18/384,094

(22) Filed: Oct. 26, 2023

(65) Prior Publication Data

US 2025/0002004 A1 Jan. 2, 2025

(30) Foreign Application Priority Data

Jun. 29, 2023 (KR) .......................... 10-2023-0084429

(51) Int. Cl.
*B60W 30/04* (2006.01)
*B60W 30/045* (2012.01)

(52) U.S. Cl.
CPC ..... *B60W 30/045* (2013.01); *B60W 2520/105* (2013.01); *B60W 2520/125* (2013.01); *B60W 2540/18* (2013.01)

(58) Field of Classification Search
CPC ......... B60W 30/045; B60W 2520/105; B60W 2520/125; B60W 2540/18; B60W 2520/10; B60W 2552/40; B60W 50/14; B60W 10/08; B60W 30/18009; B60W 40/10; B60W 50/0097; B60W 2420/403; B60W 2510/20; B60W 2520/26; B60W 2530/20; B60W 2556/50; B60W 2720/30; B60W 2720/406; B60L 3/12; B60L 15/2036; B60Y 2200/91; Y02T 10/64
See application file for complete search history.

(56) References Cited

U.S. PATENT DOCUMENTS

2023/0339468 A1* 10/2023 Choi ................. B60W 60/0015
2023/0347930 A1* 11/2023 Choi ............... B60W 30/18009

* cited by examiner

*Primary Examiner* — Xiao En Mo
(74) *Attorney, Agent, or Firm* — Morgan, Lewis & Bockius LLP

(57) ABSTRACT

Provided are a vehicle driving information providing method and system, the method including: operating in a turning radius control mode by determining a parking situation or a U-turn situation while a vehicle is driving; determining a driving force for each of wheels located on left and right sides of the vehicle according to one predetermined configuration mode, which is set up for an operation in the turning radius control mode, among a plurality of predetermined configuration modes including different target turning radii of the vehicle; and generating and outputting an expected driving path of the vehicle, based on the determined driving force.

20 Claims, 7 Drawing Sheets

VEHICLE DRIVING INFORMATION PROVIDING METHOD AND SYSTEM

CROSS-REFERENCE TO RELATED APPLICATION(S)

present application claims priority to Korean Patent Application No. 10-2023-0084429, filed on Jun. 29, 2023, the entire contents of which is incorporated herein for all purposes by this reference.

BACKGROUND OF THE PRESENT DISCLOSURE

Field of the Present Disclosure

The present disclosure relates to a vehicle driving information providing method and system for providing information on a current driving situation of a vehicle.

Description of Related Art

Recently, as interest in eco-friendliness increases, demand for an electrified vehicle having an electric motor as a driving source, such as a hybrid electric vehicle (HEV) or an electric vehicle (EV), is increasing. There is a trend that a dedicated platform having a long wheelbase compared to the overall length is applied to such an electrified vehicle.

A long wheelbase compared to the overall length of a vehicle can help improve the overall riding comfort or straight driving stability of the vehicle, but may be a factor in increasing a turning radius when the vehicle turns, and the increase in the turning radius may cause discomfort in a vehicle operation. For example, in a driving situation such as parking or a U-turn, a situation may occur in which the vehicle is required to be steered while moving forwards and backwards several times due to a long wheelbase even in case of a space where the existing vehicle can enter or exit by turning just once.

To solve the present problem, conventionally, the turning performance and turning stability have been improved by changing a turning radius of a vehicle through driving force distribution. However, as the driving force distribution is performed without the knowledge of a driver under specific conditions and driving situations, the driver's operation is performed differently from the driver's own experience and will, which causes confusion to the driver.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle driving information providing method and system for providing an expected driving path of a vehicle according to driving force distribution, to allow a driver to be aware of the expected driving path.

The technical subjects pursued in an exemplary embodiment of the present disclosure may not be limited to the above-mentioned technical subjects, and other technical subjects which are not mentioned may be clearly understood, through the following descriptions, by those skilled in the art to which the present disclosure pertains.

A vehicle driving information providing method according to an exemplary embodiment of the present disclosure may include: operating in a turning radius control mode by determining a parking situation or a U-turn situation while a vehicle is driving; determining a driving force for each of wheels located on left and right sides of the vehicle according to one predetermined configuration mode, which is set up for an operation in the turning radius control mode, among a plurality of predetermined configuration modes including different target turning radii of the vehicle; and generating and outputting an expected driving path of the vehicle, based on the determined driving force.

For example, the operating may include: collecting vehicle speed information, navigation information, and sensor information while the vehicle is driving; and operating the vehicle in the turning radius control mode by determining the parking situation or the U-turn situation, based on at least one of the collected vehicle speed information, navigation information, and sensor information.

For example, the operating may include: in response that a vehicle speed included in the vehicle speed information among the collected vehicle speed information, navigation information, and sensor information is equal to or less than a predetermined reference value and at least one of a parking sensor and a camera sensor collecting the sensor information is activated, operating the vehicle in the turning radius control mode by concluding that the vehicle is in the parking situation.

For example, the operating may include: in response that a vehicle speed included in the vehicle speed information among the collected vehicle speed information, navigation information, and sensor information is equal to or less than a predetermined reference value and the vehicle has entered a U-turn section on a driving path included in the navigation information, operating the vehicle in the turning radius control mode by concluding that the vehicle is in the U-turn situation.

For example, the determining of the driving force may include: loading a driving force distribution map corresponding to the one predetermined configuration mode; and determining the driving force for each of the wheels located on the left and right sides of the vehicle, based on the loaded driving force distribution map.

For example, the determining of the driving force may include: collecting vehicle speed information and steering information of the vehicle when operating in the turning radius control mode; judging a driving force distribution ratio for at least one of the wheels located on the left and right sides of the vehicle in consideration of the loaded driving force distribution map, the collected vehicle speed information and the collected steering information; and determining the driving force for each of the wheels, based on the judged driving force distribution ratio.

For example, the judging of driving force distribution ratio may include judging the driving force distribution ratio, based on a correction map according to the collected steering information of the vehicle and the loaded driving force distribution map.

For example, the determining of the driving force may include: collecting a driver's demand torque information and torque limit information; judging a driving force for each of the wheels, based on the demand torque information and the judged driving force distribution ratio; and determining the driving force for each of the wheels, based on the judged driving force and the torque limit information.

For example, the torque limit information may be information configured in consideration of at least one of the vehicle speed of the vehicle, the demand torque information, longitudinal or lateral acceleration of the vehicle, slip occurrence of the vehicle, and a tire friction coefficient.

For example, the method may further include, after the determining of the driving force, controlling each of the wheels located on the left and right sides of the vehicle, based on the determined driving force.

For example, the outputting of the expected driving path may include: collecting vehicle speed information and steering information of the vehicle; and generating and outputting the expected driving path, based on the determined driving force, the collected vehicle speed information and the collected steering information.

Furthermore, a vehicle driving information providing system according to an exemplary embodiment of the present disclosure for achieving the above aspect may include: a vehicle driving controller configured to, in operating in a turning radius control mode by determining a parking situation or a U-turn situation while a vehicle is driving, determine a driving force for each of wheels located on left and right sides of the vehicle according to one predetermined configuration mode, which is set up for an operation in the turning radius control mode, among a plurality of predetermined configuration modes including different target turning radii, and generate an expected driving path of the vehicle, based on the determined driving force; and an output device electrically connected to the vehicle driving controller and configured to output an expected driving path generated by the vehicle driving controller.

For example, the vehicle driving controller may collect vehicle speed information, navigation information, and sensor information while the vehicle is driving, and judge whether to operate the vehicle in the turning radius control mode by determining the parking situation or the U-turn situation, based on at least one of the collected vehicle speed information, navigation information, and sensor information.

For example, in response that a vehicle speed included in the vehicle speed information among the collected vehicle speed information, navigation information, and sensor information is equal to or less than a predetermined reference value and at least one of a parking sensor and a camera sensor collecting the sensor information is activated, the vehicle driving controller may operate the vehicle in the turning radius control mode by concluding that the vehicle is in the parking situation.

For example, in response that a vehicle speed included in the vehicle speed information among the collected vehicle speed information, navigation information, and sensor information is equal to or less than a predetermined reference value and the vehicle has entered a U-turn section on a driving path included in the navigation information, the vehicle driving controller may operate the vehicle in the turning radius control mode by concluding that the vehicle is in the U-turn situation.

For example, the vehicle driving controller may load a driving force distribution map corresponding to the one predetermined configuration mode, and determine the driving force for each of the wheels located on the left and right sides of the vehicle, based on the loaded driving force distribution map.

For example, the vehicle driving controller may collect vehicle speed information and steering information of the vehicle in operating in the turning radius control mode, judge a driving force distribution ratio for at least one of the wheels located on the left and right sides of the vehicle in consideration of the loaded driving force distribution map, the collected vehicle speed information and the collected steering information, and determine the driving force for each of the wheels, based on the judged driving force distribution ratio.

For example, the vehicle driving controller may judge the driving force distribution ratio, based on a correction map according to the collected steering information of the vehicle and the loaded driving force distribution map.

For example, the vehicle driving controller may collect a driver's demand torque information and torque limit information, judge a driving force for each of the wheels, based on the demand torque information and the judged driving force distribution ratio, and determine a driving force for each of the wheels, based on the judged driving force and the torque limit information.

For example, the vehicle driving controller may collect vehicle speed information and steering information of the vehicle, and generate the expected driving path, based on the determined driving force, the collected vehicle speed information and the collected steering information, and transmit the expected driving path to be output.

According to a vehicle driving information providing method and system of the present disclosure, a turning radius of a vehicle may be reduced by performing driving force distribution on each wheel of the vehicle according to a target turning radius of the vehicle. The present driving force distribution may be useful for a vehicle including a long wheelbase compared to the overall length.

Furthermore, an expected driving path of a vehicle according to the driving force distribution is generated and output, and thus as a driver recognizes the expected driving path of the vehicle in advance and operates the vehicle, the driver can operate the vehicle with a consistent sense, and the driver's driving convenience may be increased.

Advantageous effects obtainable from the present disclosure may not be limited to the above-mentioned effects, and other effects which are not mentioned may be clearly understood, through the following descriptions, by those skilled in the art to which the present disclosure pertains.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
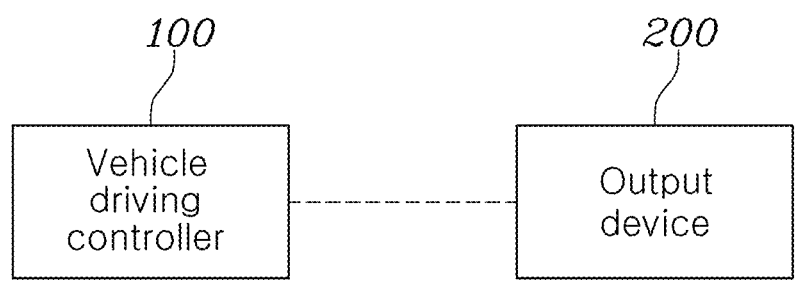
FIG. 1 is a block diagram showing a configuration of a vehicle driving information providing system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

In describing embodiments included in the present specification, when the detailed description of the relevant known technology is determined to unnecessarily obscure the gist of the present disclosure, the detailed description may be omitted. Furthermore, the accompanying drawings are provided only for easy understanding of the exemplary embodiments included in the present specification, and the technical spirit included herein is not limited to the accompanying drawings, and it should be understood that all changes, equivalents, or substitutes thereof are included in the spirit and scope of the present disclosure.

Terms including an ordinal number such as "first", "second", or the like may be used to describe various elements, but the elements are not limited to the terms. The above terms are used only for distinguishing one element from another element.

In the case where an element is referred to as being "connected" or "coupled" to any other element, it should be understood that another element may be provided therebetween, as well as that the element may be directly connected or coupled to the other element. In contrast, in the case where an element is "directly connected" or "directly coupled" to any other element, it should be understood that no other element is present therebetween.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Hereinafter, various exemplary embodiments included in the present specification will be described in detail with reference to the accompanying drawings, and the same or similar elements are provided the same and similar reference numerals, so duplicate descriptions thereof will be omitted.

An exemplary embodiment of the present disclosure proposes to enter a turning radius control mode by recognizing a specific situation, to differentially distribute a driving force for each driving wheel to satisfy a target turning trajectory for each driving wheel within a turning radius control mode, and to output a distribution result in a predetermined form. Such a turning radius control mode may be useful for a vehicle including a long wheelbase compared to the overall length.

To differentially distribute a driving force to each driving wheel, a driving force distribution device may be provided between a driving wheel and a power source. For example, the driving force distribution device may be implemented through a braking device configured to perform partial braking, an electronic limited slip differential (e-LSD), a dual clutch, and the like, but this is exemplary and the present disclosure is not necessarily limited thereto. According to another implementation, when a driving source capable of independent control is disposed for each driving wheel, such as including an in-wheel motor on each driving wheel, the driving source itself is configured as a driving force distribution device.

Hereinafter, a configuration of a vehicle driving information providing system according to an exemplary embodiment of the present disclosure will be described with reference to FIG. 1.

FIG. 1 is a block diagram showing a configuration of a vehicle driving information providing system according to an exemplary embodiment of the present disclosure.

Referring to FIG. 1, a vehicle driving information providing system according to an exemplary embodiment of the present disclosure may include a vehicle driving controller 100 and an output device 200. FIG. 1 mainly shows components related to an exemplary embodiment of the present disclosure, and it is natural that fewer or more components may be included in implementing an actual vehicle driving information providing system.

Hereinafter, each component will be described.

The vehicle driving controller 100 may be configured to determine a driving force for a plurality of wheels provided in a vehicle, and generate an expected driving path of the vehicle, based on the determined driving force. Furthermore, the vehicle driving controller 100 may transmit the generated expected driving path of the vehicle to the output device 200. This will be described later with reference to FIG. 2.

In the implementation of the vehicle driving controller 100 according to an exemplary embodiment of the present disclosure, according to the type of vehicle, the vehicle driving controller 100 may be implemented as one function of a high-level controller such as a hybrid control unit (HCU) in the case of a hybrid vehicle (HEV) or a vehicle control unit (VCU) in the case of an electric vehicle (EV). However, this is exemplary and the present disclosure is not necessarily limited thereto. For example, the vehicle driving controller 100 may be implemented as a controller separate from a high-level controller, and its functions may be implemented in a distributed form in two or more different controllers.

The output device 200 may output the expected driving path of the vehicle generated by the vehicle driving controller 100 so that passengers of the vehicle, including a driver, can recognize the expected driving path. To the present end, the output device 200 may be a display device provided in a vehicle to visually output an expected driving path of the vehicle. For example, the output device 200 may be implemented as a display of an audio/video/navigation (AVN) system or a cluster, or the like. However, this is exemplary, and it is natural that the output device 200 may be applied in various other forms in addition to the above-mentioned device.

Hereinafter, the role of the vehicle driving controller 100 according to an exemplary embodiment of the present disclosure will be described in detail with reference to FIG. 2.

Figure 2:
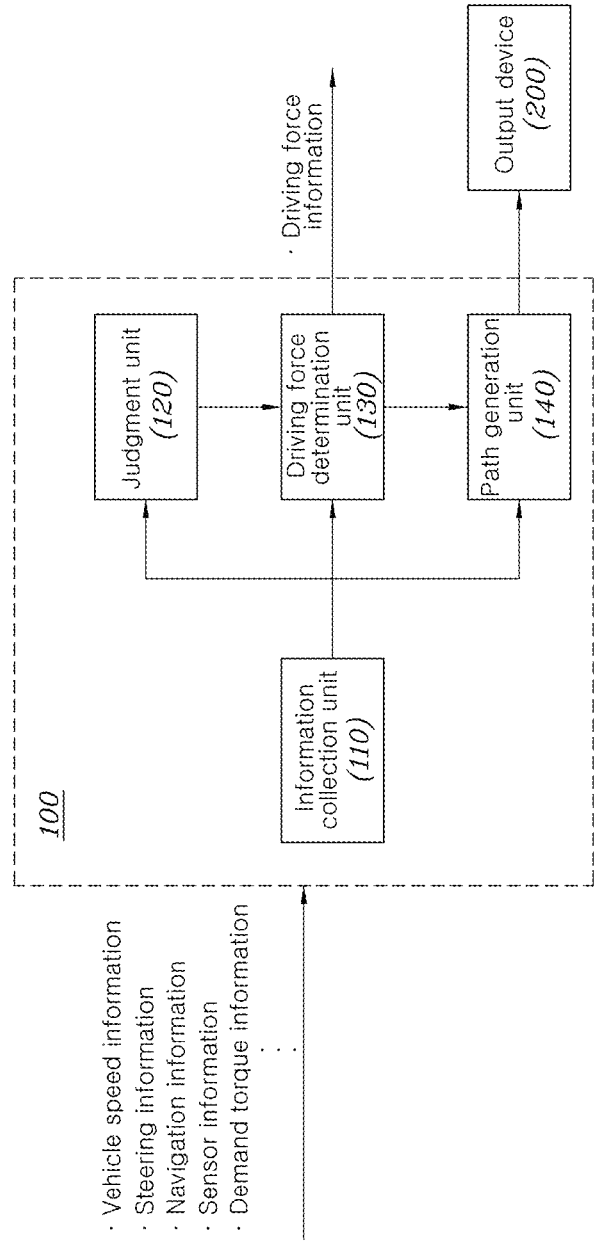
FIG. 2 is a block diagram showing a predetermined configuration of a vehicle driving controller configured to provide vehicle driving information according to an exemplary embodiment of the present disclosure.

FIG. 2 is a block diagram showing a predetermined configuration of a vehicle driving controller configured to provide vehicle driving information according to an exemplary embodiment of the present disclosure.

Referring to FIG. 2, the vehicle driving controller 100 according to an exemplary embodiment of the present disclosure may include an information collection unit 110, a judgment unit 120, a driving force determination unit 130, and a path generation unit 140. However, this is exemplary and the present disclosure is not necessarily limited thereto. For example, the vehicle driving controller 100 may include fewer or more components than the above-mentioned components.

Hereinafter, each component will be described.

The information collection unit 110 may collect information required by the judgment unit 120, the driving force determination unit 130, and the path generation unit 140. For example, the information collection unit 110 may collect multiple pieces of information including vehicle speed information, steering information, navigation information, and sensor information of a vehicle, a driver's demand torque information, and the like. Furthermore, the information collection unit 110 may receive an input of information on a friction coefficient of a tire provided in the vehicle in addition to the above-described information, and collect the information.

The information collection unit 110 may collect the above-described multiple pieces of information in advance and provide the stored information to the judgment unit 120, the driving force determination unit 130, and the path generation unit 140, and may collect information whenever required by the judgment unit 120, the driving force determination unit 130, and the path generation unit 140. However, this is exemplary and the present disclosure is not necessarily limited thereto.

The judgment unit 120 may allow the controller to operate in a turning radius control mode by determining a parking situation or a U-turn situation while the vehicle is driving, based on at least one of information collected by the information collection unit 110. The judgment unit 120 may receive vehicle speed information, navigation information, and sensor information from the information collection unit 110, and recognize the parking situation or the U-turn situation while the vehicle is driving, based on at least one of the provided information.

For example, the judgment unit 120 may judge whether a vehicle speed included in the vehicle speed information is equal to or less than a predetermined reference value and at least one of a parking sensor and a camera sensor collecting the sensor information is activated. In the instant case, the activation of the parking sensor may mean that a parking assist function of the vehicle is activated, and the activation of the camera sensor may mean that a rear camera of the vehicle is activated or a surround view mode is activated. When the vehicle speed is equal to or less than the predetermined reference value and at least one of the parking sensor and the camera sensor is activated, the judgment unit 120 may recognize that a driving situation of the vehicle is the parking situation and thus allow the controller to operate in the turning radius control mode.

As described above, when a condition is automatically satisfied while the vehicle is driving through the judgment unit 120, an operation in the turning radius control mode may be configured to be performed. However, the parking sensor and the camera sensor may be activated by a driver's manual operation (e.g., button operation). Accordingly, the driver may select and configure, in advance, whether the operation in the turning radius control mode is to be performed automatically or manually, and when at least one of the parking sensor and the camera sensor is activated, the judgment unit 120 may judge whether the at least one is activated automatically or manually, and thus allow the controller to operate in the turning radius control mode.

As an exemplary embodiment of the present disclosure, the judgment unit 120 may judge whether a vehicle speed included in the vehicle speed information is equal to or less than a predetermined reference value and the vehicle has entered a U-turn section on a driving path included in the navigation information. The judgment unit 120 may judge whether the vehicle has currently entered the U-turn section, based on the driving path included in the navigation information. When the vehicle speed is equal to or less than the predetermined reference value and the vehicle has entered the U-turn section, the judgment unit 120 may recognize that a driving situation of the vehicle is the U-turn situation and thus allow the controller to operate in the turning radius control mode.

In the instant case, when the judgment unit 120 recognizes that the driving situation of the vehicle is the parking situation or the U-turn situation and thus the controller is configured to operate in the turning radius control mode, the vehicle driving controller 100 may output information on an operation in the turning radius control mode through the output device 200 to notify a driver that the controller is configured to operate in the turning radius control mode. In the instant case, the information on the operation in the turning radius control mode may be output through the output device 200 in a visual or auditory output manner.

When the controller is configured to operate in the turning radius control mode according to a judgment result of the judgment unit 120, the driving force determination unit 130 may be configured to determine a driving force for each of wheels located on left and right sides of the vehicle according to one predetermined configuration mode, which is set up for an operation in the turning radius control mode, among a plurality of predetermined configuration modes configured differently according to a target turning radius of the vehicle. The plurality of predetermined configuration modes will be described with reference to FIG. 3.

Figure 3:
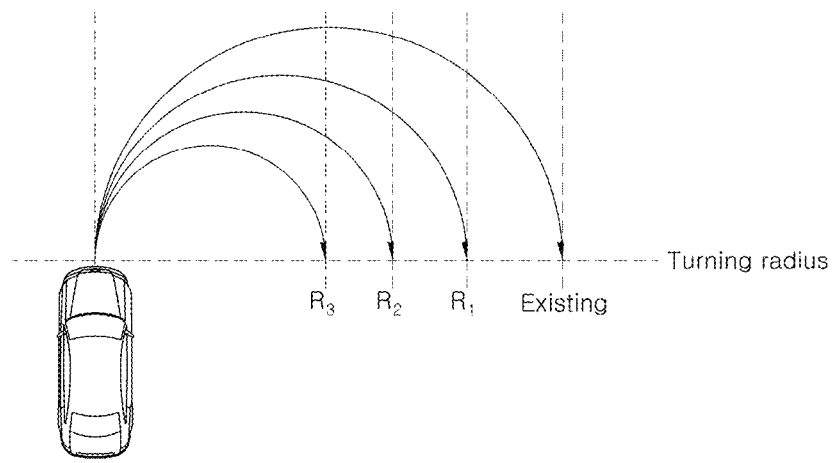
FIG. 3 is a diagram illustrating a plurality of predetermined configuration modes which are set up for an operation in a turning radius control mode according to an exemplary embodiment of the present disclosure.

FIG. 3 is a diagram illustrating a plurality of predetermined configuration modes which are set up for an operation in a turning radius control mode according to an exemplary embodiment of the present disclosure.

Referring to FIG. 3, a plurality of predetermined configuration modes capable of reducing a turning radius compared to a turning radius of the existing vehicle in operating in a turning radius control mode may be configured. The plurality of predetermined configuration modes may be set up to have different target turning radii, and the plurality of predetermined configuration modes according to various exemplary embodiments of the present disclosure may be configured in three modes. In the instant case, the plurality of predetermined configuration modes may include a first predetermined configuration mode, a second predetermined configuration mode, and a third predetermined configuration mode, and a target turning radius of a vehicle may be set up to decrease as a mode number of a predetermined configuration mode increases. For example, a target turning radius of the vehicle corresponding to the first predetermined configuration mode may be R1, a target turning radius of the vehicle corresponding to the second predetermined configuration mode may be R2, and a target turning radius of the vehicle corresponding to the third predetermined configuration mode may be R3.

That is, the plurality of predetermined configuration modes may be performed only when the turning radius control mode is operated, and the driving force determination unit 130 may be configured to determine a driving force according to one predetermined configuration mode, which is set up for an operation in the turning radius control mode, among the plurality of predetermined configuration modes. In the instant case, the one predetermined configuration mode may be set up by a driver's selection in operating in the turning radius control mode, the driver may select one predetermined configuration mode among the plurality of predetermined configuration modes in advance, and load the one predetermined configuration mode configured in advance for the operation in the turning radius control mode. When the driver does not select one predetermined configuration mode among the plurality of predetermined configuration modes, one predetermined configuration mode corresponding to a basic configuration value among the plurality of predetermined configuration modes may be set up.

Returning to FIG. 2 again, the driving force determination unit 130 may be configured to determine a driving force for each of the wheels located on the left and right sides of the vehicle according to one predetermined configuration mode. The driving force determination unit 130 may load a driving force distribution map corresponding to the configured one predetermined configuration mode, and determine the driving force for each of the wheels located on the left and right sides of the vehicle, based on the loaded driving force distribution map. The driving force distribution map may be a plurality of maps previously stored in the driving force determination unit 130 to correspond to the plurality of predetermined configuration modes, respectively, and may refer to a map formed based on a vehicle speed and a steering angle of the vehicle.

The driving force determination unit 130 may receive vehicle speed information and steering information from the information collection unit 110, and judge a driving force distribution ratio corresponding to the current vehicle speed and steering from the loaded driving force distribution map, based on the loaded driving force distribution map and the received vehicle speed information and steering information. In the instant case, the driving force distribution ratio may refer to a numerical value between 0 and 1, and the driving force distribution ratio determined by the driving force determination unit 130 may refer to a driving force distribution ratio for one of the left side and the right side of the vehicle. However, in the case of vehicle steering, since the driving force distribution ratio may be continuously changed according to the driver's operation, an error may occur when judging a driving force distribution ratio corresponding to the collected vehicle speed information and the collected steering information. To solve the present problem, a correction map according to the steering information may be stored in the driving force determination unit 130, and the correction map may refer to a map formed based on a steering angle of the vehicle and a steering angle change rate. The driving force determination unit 130 may judge a driving force distribution ratio, based on the correction map according to the steering information and the loaded driving force distribution map.

The driving force determination unit 130 may be configured to determine a driving force for each of the wheels located on the left and right sides of the vehicle, based on the judged driving force distribution ratio. For example, when the judged driving force distribution ratio is 0.3 and is a driving force distribution ratio for the wheel located on the left side of the vehicle, the driving force determination unit 130 may be configured to determine a driving force for the wheel located on the left side of the vehicle as 0.3, which is the judged driving force distribution ratio, and determine a driving force for the wheel located on the right side of the vehicle as 0.7, which is a value obtained by subtracting the judged driving force distribution ratio from 1. However, this is exemplary and the present disclosure is not necessarily limited thereto.

Furthermore, the driving force determination unit 130 may collect a driver's demand torque information and torque limit information, and judge a driving force for each of the wheels located on the left and right sides of the vehicle, based on the demand torque information and the judged driving force distribution ratio. Furthermore, the driving force determination unit 130 may be configured to determine a final driving force for each of the wheels, based on the judged driving force for each of the wheels and the torque limit information. The torque limit information may be information configured in consideration of at least one of a vehicle speed of the vehicle, demand torque information, longitudinal or lateral acceleration of the vehicle, slip occurrence of the vehicle, and a tire friction coefficient. That is, when the driving force determination unit 130 determines a driving force for each of the wheels located on the left and right sides of the vehicle, based on the driver's demand torque information and the judged driving force distribution ratio, the driving force determination unit 130 may be configured to determine a final driving force in consideration of the torque limit information obtained by reflecting a driving state of the vehicle, to include a stable and conservative driving force for each of the wheels located on the left and right sides of the vehicle.

The driving force determination unit 130 may be configured to determine a driving force for each of the wheels located on the left and right sides of the vehicle. For example, the driving force determination unit 130 may be configured to determine driving forces for a front wheel and a rear wheel located on the left side of the vehicle and a front wheel and a rear wheel located on the right side of the vehicle, respectively. However, this is exemplary and the present disclosure is not necessarily limited thereto. For example, the driving force determination unit 130 may be configured to determine a driving force only for the front wheel located on the left side of the vehicle and the front wheel located on the right side of the vehicle.

The driving force determination unit 130 may transmit information on the determined driving force by which each of the wheels located on the left and right sides of the vehicle may be controlled, to an external device. For example, the driving force determination unit 130 according to an exemplary embodiment of the present disclosure may transmit information on the determined driving force for each of the wheels located on the left and right sides of the vehicle, to a driving force distribution device which is separately provided. The driving force distribution device may be configured for controlling each of the wheels located on the left and right sides of the vehicle, based on the transmitted driving force information.

The path generation unit 140 may be configured to generate an expected driving path of the vehicle, based on the driving force determined by the driving force determination unit 130. The path generation unit 140 may receive vehicle speed information and steering information of the vehicle from the information collection unit 110, and generate an expected driving path of the vehicle, based on the vehicle speed information, steering information and the driving force for each of the wheels located on the left and right sides of the vehicle determined by the driving force determination unit 130.

The path generation unit 140 may transmit information on the generated expected driving path of the vehicle to the output device 200, and the output device 200 may output the expected driving path so that the driver recognizes the expected driving path. This will be described later with reference to FIG. 4.

Figure 4:
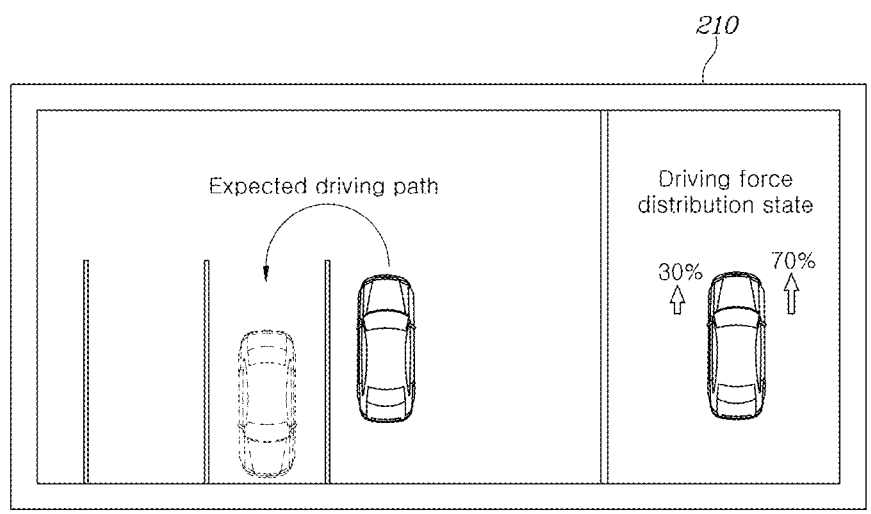
FIG. 4 and FIG. 5 are diagrams showing an appearance of an output device provided with vehicle driving information according to an exemplary embodiment of the present disclosure.
Figure 5:
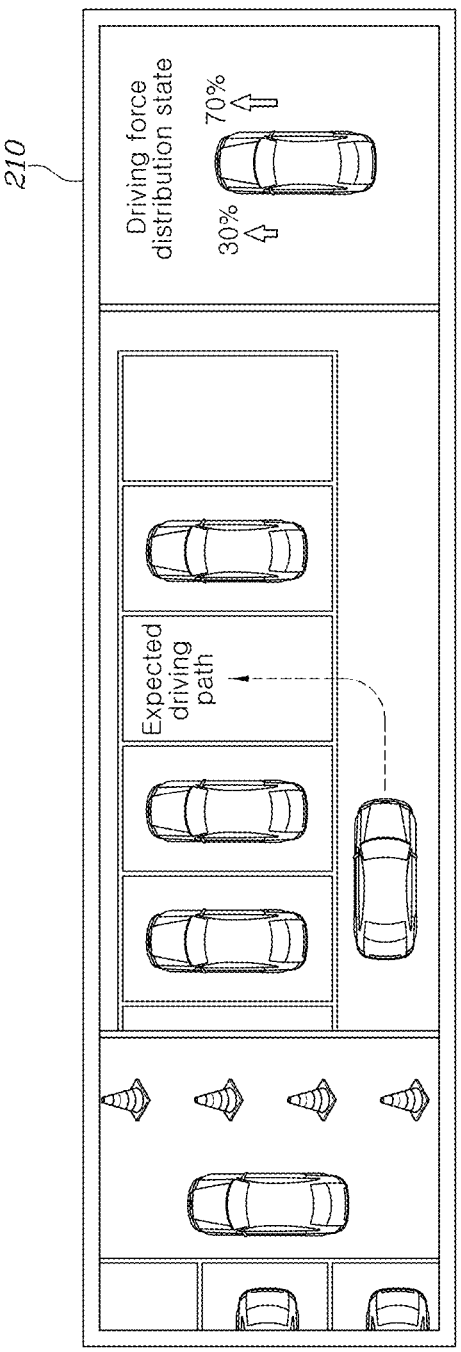

FIG. 4 and FIG. 5 are diagrams showing an appearance of an output device provided with vehicle driving information according to an exemplary embodiment of the present disclosure.

Referring to FIG. 4 and FIG. 5, the output device 200 according to an exemplary embodiment of the present disclosure may include a display unit 210 provided inside a vehicle. The output device 200 may output an expected driving path of the vehicle through the display unit 210 so that a driver recognizes the expected driving path. For example, referring to FIG. 4, a screen of the display unit 210 may be divided into two areas, and the output device 200 may output an expected driving path when the vehicle makes a U-turn in one of the two areas of the display unit 210, and output, in the other area, information on a driving force distribution state for each of the wheels located on the left and right sides of the vehicle determined by the driving force determination unit 130.

As an exemplary embodiment of the present disclosure, referring to FIG. 5, the screen of the display unit 210 may be divided into three areas, and the output device 200 may output an image captured when a surround view mode is performed, in one of the three areas of the display unit 210, output, in another one of the three areas, an expected driving path in a case where the vehicle is parked, and output, in the other area, information on a driving force distribution state for each of the wheels located on the left and right sides of the vehicle determined by the driving force determination unit 130. However, the appearance of the display unit 210 shown in FIG. 4 and FIG. 5 is exemplary, and the present disclosure is not necessarily limited thereto.

Hereinafter, a vehicle driving information providing method according to an exemplary embodiment will be described with reference to FIG. 6 and FIG. 7 based on the configuration of the vehicle driving information providing system described above with reference to FIG. 1 and FIG. 2.

Figure 6:
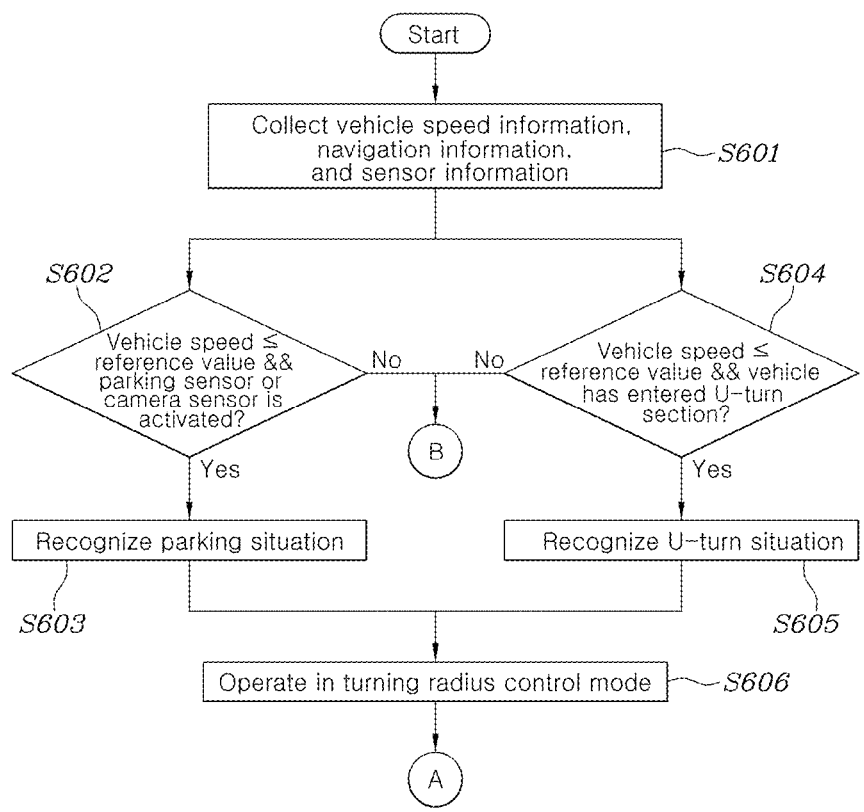
FIG. 6 and FIG. 7 are flowcharts of a vehicle driving information providing method according to an exemplary embodiment of the present disclosure.
Figure 7:
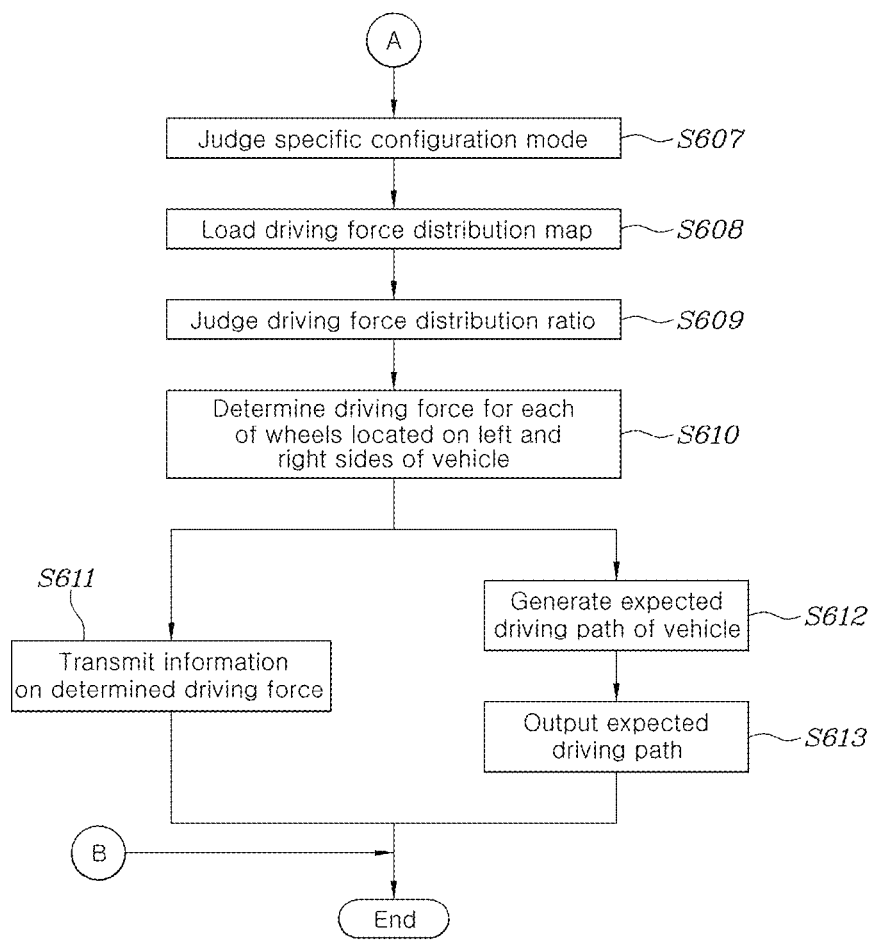

In FIG. 6 and FIG. 7, for convenience of description, it is assumed that the above-described information collection unit 110, judgment unit 120, driving force determination unit 130, and path generation unit 140 are implemented as the vehicle driving controller 100. Furthermore, because the detailed description of each step has been described above with reference to FIG. 1 and FIG. 2, the detailed description will be omitted below.

FIG. 6 and FIG. 7 are flowcharts of a vehicle driving information providing method according to an exemplary embodiment of the present disclosure.

First, referring to FIG. 6, the vehicle driving controller 100 may collect vehicle speed information, navigation information, and sensor information (S601), and allow the controller to operate in a turning radius control mode by determining a parking situation or a U-turn situation while a vehicle is driving, based on at least one of the collected vehicle speed information, navigation information, and sensor information.

For example, when a vehicle speed included in the vehicle speed information among the collected vehicle speed information, navigation information, and sensor information is equal to or less than a predetermined reference value and at least one of a parking sensor and a camera sensor collecting the sensor information is activated (Yes in S602), the vehicle driving controller 100 may recognize that the vehicle is in the parking situation (S603). As an exemplary embodiment of the present disclosure, when a vehicle speed included in the vehicle speed information among the collected vehicle speed information, navigation information, and sensor information is equal to or less than a predetermined reference value and the vehicle has entered a U-turn section on a driving path included in the navigation information (Yes in S604), the vehicle driving controller 100 may recognize that the vehicle is in the U-turn situation (S605). The vehicle driving controller 100 may allow the turning radius control mode to be operated when the vehicle is recognized as in the parking situation or U-turn situation (S606).

Furthermore, referring to FIG. 7, the vehicle driving controller 100 may judge one predetermined configuration mode, which is configured for an operation in the turning radius control mode, among a plurality of predetermined configuration modes including different target turning radii (S607). The vehicle driving controller 100 may load a driving force distribution map corresponding to the one predetermined configuration mode configured for the operation in the turning radius control mode (S608), and may judge a driving force distribution ratio corresponding to the current vehicle speed and steering in consideration of vehicle speed information and steering information, based on the loaded driving force distribution map (S609).

The vehicle driving controller 100 may be configured to determine a driving force for each of wheels located on left and right sides of the vehicle, based on the judged driving force distribution ratio and a driver's demand torque information (S610). The vehicle driving controller 100 may transmit information on the determined driving force to a driving force distribution device which is separately provided (S611), and allow the driving force distribution device to control each of the wheels located on the left and right sides of the vehicle according to the determined driving force.

Furthermore, the vehicle driving controller 100 may be configured to generate an expected driving path of the vehicle, based on the determined driving force, the vehicle speed information, and the steering information (S612), and transmit information on the generated expected driving path to the output device 200. The output device 200 may output the received information on the expected driving path (S613) so that a driver recognizes a driving situation of the vehicle.

According to the description above, a turning radius of a vehicle may be reduced by performing driving force distribution on each wheel of the vehicle according to a target turning radius of the vehicle through the vehicle driving information providing method and system of the present disclosure.

Furthermore, an expected driving path of the vehicle according to the driving force distribution is generated and output, and thus as a driver recognizes the expected driving path of the vehicle in advance and operates the vehicle, the driver can operate the vehicle with a consistent sense, and the driver's driving convenience may be increased.

Although the present disclosure has been described and illustrated in conjunction with various exemplary embodiments thereof, it will be apparent to those skilled in the art that various improvements and modifications may be made to the present disclosure without departing from the technical idea of the present disclosure defined by the appended claims.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle driving information providing method comprising:
   operating, by a vehicle driving controller, a vehicle in a turning radius control mode by determining a parking situation or a U-turn situation while the vehicle is driving;
   determining, by the vehicle driving controller, a driving force for each of wheels located on left and right sides of the vehicle according to one predetermined configuration mode, which is set up for an operation in the turning radius control mode, among a plurality of predetermined configuration modes including different target turning radii of the vehicle; and generating and outputting, by the vehicle driving controller, an expected driving path of the vehicle, based on the determined driving force.

2. The method of claim 1, wherein the operating includes:
collecting vehicle speed information, navigation information, and sensor information while the vehicle is driving; and
operating the vehicle in the turning radius control mode by determining the parking situation or the U-turn situation, based on at least one of the collected vehicle speed information, navigation information, and sensor information.

3. The method of claim 2, wherein the operating further includes:
in response that a vehicle speed included in the vehicle speed information among the collected vehicle speed information, navigation information, and sensor information is equal to or less than a predetermined reference value and at least one of a parking sensor and a camera sensor collecting the sensor information is activated, operating the vehicle in the turning radius control mode by concluding that the vehicle is in the parking situation.

4. The method of claim 2, wherein the operating further includes:
in response that a vehicle speed included in the vehicle speed information among the collected vehicle speed information, navigation information, and sensor information is equal to or less than a predetermined reference value and the vehicle has entered a U-turn section on a driving path included in the navigation information, operating the vehicle in the turning radius control mode by concluding that the vehicle is in the U-turn situation.

5. The method of claim 1, wherein the determining of the driving force includes:
loading a driving force distribution map corresponding to the one predetermined configuration mode; and
determining the driving force for each of the wheels located on the left and right sides of the vehicle, based on the loaded driving force distribution map.

6. The method of claim 5, wherein the determining of the driving force includes:
collecting vehicle speed information and steering information of the vehicle;
judging a driving force distribution ratio for at least one of the wheels located on the left and right sides of the vehicle in consideration of the loaded driving force distribution map, the collected vehicle speed information and the collected steering information; and
determining the driving force for each of the wheels, based on the judged driving force distribution ratio.

7. The method of claim 6, wherein the judging of the driving force distribution ratio includes judging the driving force distribution ratio, based on a correction map according to the collected steering information of the vehicle and the loaded driving force distribution map.

8. The method of claim 6, wherein the determining of the driving force includes:
collecting a driver's demand torque information and torque limit information;
judging the driving force for each of the wheels, based on the demand torque information and the judged driving force distribution ratio; and
determining the driving force for each of the wheels, based on the judged driving force and the torque limit information.

9. The method of claim 8, wherein the torque limit information is information configured in consideration of at least one of a vehicle speed of the vehicle, the demand torque information, longitudinal or lateral acceleration of the vehicle, slip occurrence of the vehicle, and a tire friction coefficient.

10. The method of claim 1, further including:
after the determining of the driving force, controlling, by the vehicle driving controller, each of the wheels located on the left and right sides of the vehicle, based on the determined driving force.

11. The method of claim 1, wherein the outputting of the expected driving path includes:
collecting vehicle speed information and steering information of the vehicle; and
generating and outputting the expected driving path, based on the determined driving force, the collected vehicle speed information and the collected steering information.

12. A vehicle driving information providing system comprising:
a vehicle driving controller configured to, in operating a vehicle in a turning radius control mode by determining a parking situation or a U-turn situation while the vehicle is driving, determine a driving force for each of wheels located on left and right sides of the vehicle according to one predetermined configuration mode, which is set up for an operation in the turning radius control mode, among a plurality of predetermined configuration modes including different target turning radii, and generate an expected driving path of the vehicle, based on the determined driving force; and
an output device electrically connected to the vehicle driving controller and configured to output an expected driving path generated by the vehicle driving controller.

13. The system of claim 12, wherein the vehicle driving controller is configured to collect vehicle speed information, navigation information, and sensor information while the vehicle is driving, and judge whether to operate the vehicle in the turning radius control mode by determining the parking situation or the U-turn situation, based on at least one of the collected vehicle speed information, navigation information, and sensor information.

14. The system of claim 13, wherein the vehicle driving controller is configured to, in response that a vehicle speed included in the vehicle speed information among the collected vehicle speed information, navigation information, and sensor information is equal to or less than a predetermined reference value and at least one of a parking sensor and a camera sensor collecting the sensor information is activated, operate the vehicle in the turning radius control mode by concluding that the vehicle is in the parking situation.

15. The system of claim 13, wherein the vehicle driving controller is configured to, in response that a vehicle speed included in the vehicle speed information among the collected vehicle speed information, navigation information, and sensor information is equal to or less than a predetermined reference value and the vehicle has entered a U-turn section on a driving path included in the navigation information, operate the vehicle in the turning radius control mode by concluding that the vehicle is in the U-turn situation.

16. The system of claim 12, wherein the vehicle driving controller is configured to load a driving force distribution map corresponding to the one predetermined configuration mode, and determine the driving force for each of the wheels located on the left and right sides of the vehicle, based on the loaded driving force distribution map.

17. The system of claim 16, wherein the vehicle driving controller is configured to collect vehicle speed information and steering information of the vehicle in operating in the turning radius control mode, judge a driving force distribution ratio for at least one of the wheels located on the left and right sides of the vehicle in consideration of the loaded driving force distribution map, the collected vehicle speed information and the collected steering information, and determine the driving force for each of the wheels, based on the judged driving force distribution ratio.

18. The system of claim 17, wherein the vehicle driving controller is configured to judge the driving force distribution ratio, based on a correction map according to the collected steering information of the vehicle and the loaded driving force distribution map.

19. The system of claim 17, wherein the vehicle driving controller is configured to collect a driver's demand torque information and torque limit information, judge the driving force for each of the wheels, based on the demand torque information and the judged driving force distribution ratio, and determine the driving force for each of the wheels, based on the judged driving force and the torque limit information.

20. The system of claim 12, wherein the vehicle driving controller is configured to collect vehicle speed information and steering information of the vehicle, and generate the expected driving path, based on the determined driving force, the collected vehicle speed information and the collected steering information.

* * * * *